US010821611B1

United States Patent
DeFant et al.

(10) Patent No.: US 10,821,611 B1
(45) Date of Patent: Nov. 3, 2020

(54) MULTI-ZONE END EFFECTOR

(71) Applicant: Amazon Technologies, Inc., Seattle, WA (US)

(72) Inventors: Jon David DeFant, Seattle, WA (US); Tyler B. Rodgers, Puyallup, WA (US); Chen Ge, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 23 days.

(21) Appl. No.: 16/378,151

(22) Filed: Apr. 8, 2019

(51) Int. Cl.
*B25J 15/06* (2006.01)
*B25J 15/00* (2006.01)
*B25J 9/00* (2006.01)
*B25J 19/02* (2006.01)

(52) U.S. Cl.
CPC ......... *B25J 15/0052* (2013.01); *B25J 9/0009* (2013.01); *B25J 15/0038* (2013.01); *B25J 15/065* (2013.01); *B25J 15/0625* (2013.01); *B25J 15/0683* (2013.01); *B25J 19/023* (2013.01)

(58) Field of Classification Search
CPC .......................... B25J 15/0052; B25J 16/0038; B25J 15/0625; B25J 15/065; B25J 15/0683; B25J 9/0009
USPC .......... 294/188, 183, 185, 65, 64.3; 414/941
See application file for complete search history.

(56) References Cited

U.S. PATENT DOCUMENTS

| | | | | |
|---|---|---|---|---|
| 3,865,420 A | * | 2/1975 | Warren | B66C 1/0256 294/184 |
| 10,099,385 B2 | * | 10/2018 | Petrovski | B25J 15/0052 |
| 10,611,037 B1 | * | 4/2020 | Polido | B25J 15/0616 |
| 2008/0003092 A1 | * | 1/2008 | Baclija | B25J 19/0029 414/752.1 |
| 2012/0207574 A1 | * | 8/2012 | La Rovere | B25J 15/00 414/751.1 |
| 2012/0274011 A1 | * | 11/2012 | Schilp | B25J 15/0616 269/21 |
| 2014/0037413 A1 | * | 2/2014 | Takashima | B25J 15/0616 414/680 |
| 2014/0199153 A1 | * | 7/2014 | Reinhold | B65H 3/0816 414/800 |
| 2018/0029807 A1 | * | 2/2018 | Oono | B65G 49/061 |
| 2019/0240847 A1 | * | 8/2019 | Quast | B25J 15/0616 |

* cited by examiner

*Primary Examiner* — Paul T Chin
(74) *Attorney, Agent, or Firm* — Thomas Horstemeyer, LLP

(57) ABSTRACT

A multi-zone end effector assembly is described in the present disclosure. As a non-limiting example, the multi-zone end effector assembly comprises a manifold that comprises a first interior chamber and a second interior chamber. A first port connects to the first interior chamber, and a second port connects to the second interior chamber. A first compression cup region can be connected to the first interior chamber. The first compression cup region is in air connection with the first port. The first compression cup region is configured to be independently activated in order to create a first vacuum zone. A second compression cup region is connected to the second interior chamber. The second compression region cup is in air connection with the second port. The second compression cup region is configured to be independently activated in order to create a second vacuum zone.

20 Claims, 9 Drawing Sheets

MULTI-ZONE END EFFECTOR

BACKGROUND

In materials handling facilities, various items, articles, products, or packages may be organized for shipment to other locations or received as returned items. Robotic devices are used in various areas in these facilities in order to process packages at different stages. Robotic devices employ the use of end effectors to manipulate items. An end effector is a tool that may be connected to an end of a robotic arm. For example, as packages are being processed for shipment, an end effector may use a suction force to pick up a package.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

The present disclosure relates to a multi-zone end effector assembly. Within a materials handling facility, robotic devices may be used to process numerous packages in a limited amount of time. A materials handling facility may be a sort center, shipping center, packing center, distribution center, or other shipping, handling, packing facility, or some other similar facilities. A package may be an article, a product, a flat, a box, and other suitable containers used for shipping items. As packages are processed, they are moved between various locations through the facility.

Typically, robotic devices are used to move packages to different stations within a materials handling facility. Robotic devices employ the use of end effectors to manipulate packages and other suitable items. An end effector is a tool that may be connected to an end of a robotic arm and has a component for manipulating items. For example, some end effectors have suction cups in order to apply a vacuum or suction force on an item. The vacuum force draws the item to the suction cups. By applying the vacuum force, the end effector can pick up the item and move the item to another location.

During this process, the vacuum force created by the end effector can cause some negative effects. Particularly, the vacuum force can deform or peel off labels that have been applied to packages in a prior station. These label deformities or peeling instances can prevent the label from being read by a barcode reader or an operator at a subsequent station. The multi-zone end effector assembly of the present disclosure is able to prevent these negative effects on labels, which in turn helps the automation of processing packages in a facility. The multi-zone end effector assembly of the present disclosure enables greater control of vacuum forces and/or compression forces being applied to an item.

Figure 1A:
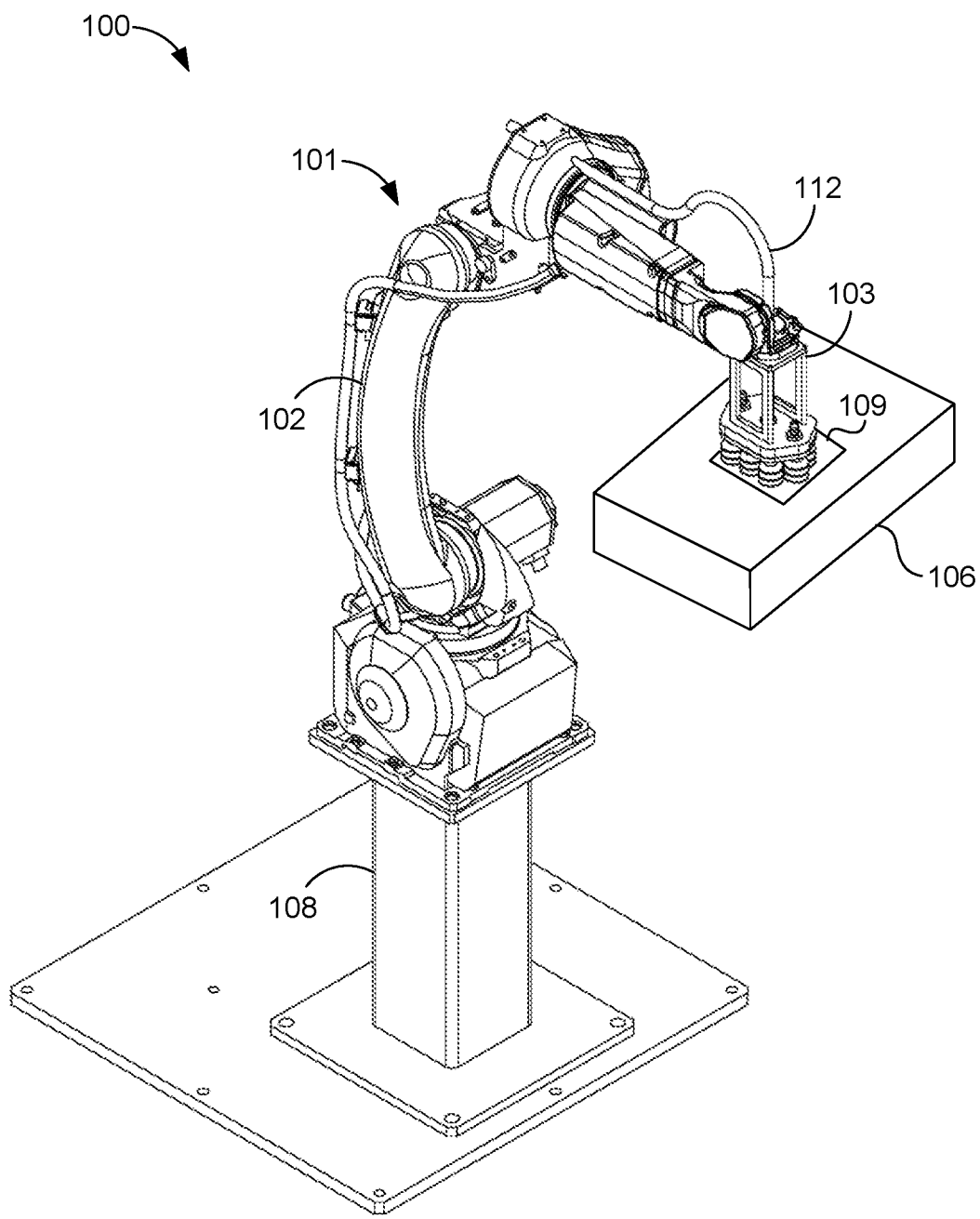
FIG. 1A illustrates a perspective view of a robotic system that includes a multi-zone end effector assembly, according to various embodiments of the present disclosure.
Figure 1B:
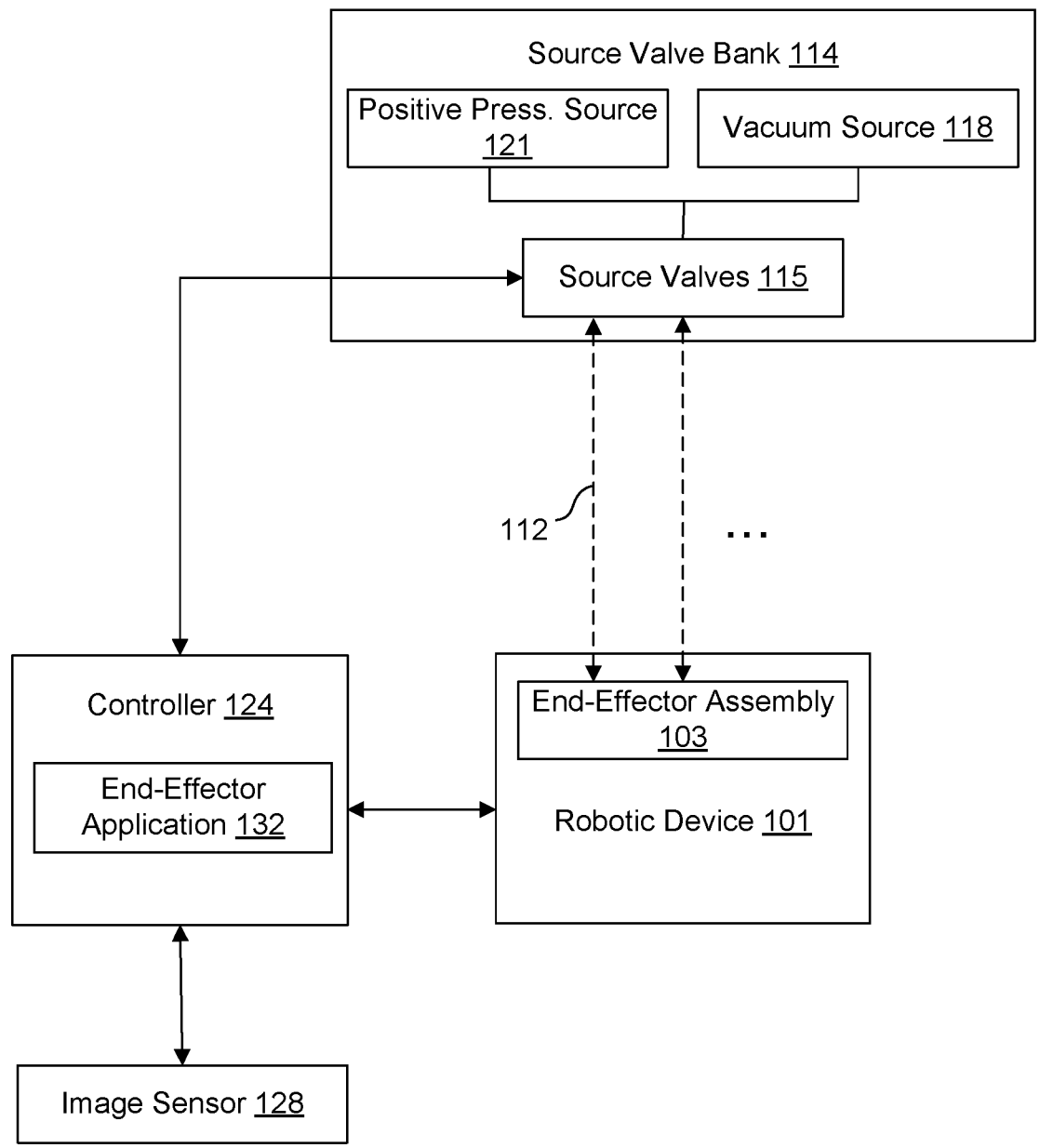
FIG. 1B illustrates an exemplary block diagram of the robotic system from FIG. 1A, according to various embodiments of the present disclosure.

With reference to FIG. 1A, shown is an example scenario of a robotic system 100 that includes a robotic device 101 coupled with a multi-zone end effector assembly 103. FIG. 1B illustrates an exemplary block diagram of the robotic system 100 from FIG. 1A. The robotic device 101 comprises a robotic arm 102 with the multi-zone end effector assembly 103 attached to its end. In the example scenario of FIG. 1A, the multi-zone end effector assembly 103 is applying a vacuum force to fasten a package 106 to the multi-zone end effector assembly 103. The robotic device 101 is moving the multi-zone end effector assembly 103 and the package 106 from a first location to a second location. The robotic device 101 is situated on a riser 108. Additionally, in the example scenario of FIG. 1A, the multi-zone end effector assembly 103 is applied to a particular location on the package 106 that has a label 109.

According to various embodiments of the present disclosure, the multi-zone end effector assembly 103 can be coupled to one or more hoses 112, which in turn are coupled to a source valve bank 114 that comprises one or more source valves 115, as illustrated in FIG. 1B. Each hose 112 can be coupled to a different region or zone 235 (FIG. 2) of the multi-zone end effector assembly 103 on one end and coupled to the source valve bank 114 on the other end. Although two hoses 112 are represented in FIG. 1B, the number of hose 112 can vary. The number of hose 112 can vary to correspond to the number of zones 235 of the multi-zone end effector 103. For example, the robotic device 101 may have two, three, four, five, or more hoses 112 for the multi-zone end effector assembly 103. The number of zones 235 can also vary. The multi-zone end effector assembly 103 can include two, three, four, five, or more zones 235. The source valve bank 114 can comprise one or more source valves 115 that open and close access to a vacuum source 118, a positive pressure source 121, and other suitable sources. In some embodiments, the source valves 115 may be vacuum valves for controlling access to the vacuum source 118, and the positive pressure source 121 may be omitted.

According to various embodiments, the multi-zone end effector assembly 103 is configured to engage with and attach to one or more packages 106. The multi-zone end effector assembly 103 includes multiple compression cups 212 (FIG. 2) that engage with the package 106. The compression cups 212 can be arranged in multiple zones 235 (FIG. 2) or regions. Each zone 235 can have an individual air or fluid connection 405 (FIG. 4A) with a particular source valve 115. Each source valve 115 can open or close access to the vacuum source 118 or positive pressure source 121. As a non-limiting example, the multi-zone end effector assembly 103 may have three zones 235 of compression cups 212. Each zone 235 can be independently coupled to a different source valve 115. Accordingly, one or more zones 235 can be independently activated to create a vacuum force that applies suction to the package 106.

The vacuum source 118 can provide a suction or vacuum force for each of the zones 235 of compression cups 212 independently of each other. The vacuum source 118 can be attached to multiple source valves 115. Each source valve 115 can be coupled to a hose 112 for a particular zone 235 of the compression cups 212. Accordingly, the magnitude of a vacuum force applied by the multi-zone end effector assembly 103 can be adjusted based on the number of zones 235 that are activated. Additionally, one or more particular zones 235 of the compression cups 212 may be activated in order to attach a particular package 106 among several packages 106 in an area, which can prevent other undesired packages 106 from being attached to the multi-zone end effector assembly 103.

The positive pressure source 121 can push air or some other suitable gas into the hose 112 and through the multi-zone end effector assembly 103 in order to equalize the pressure in the multi-zone end effector assembly 103. By equalizing pressure within the compression cups 212, the multi-zone end effector assembly 103 can place or drop an attached package 106 with greater accuracy.

As illustrated in FIG. 1B, the robotic system 100 also includes a controller(s) 124 and an image sensor 128. According to various embodiments, the operation of the robotic system 100 is controlled by the controller 124 which can be in data communication with the robotic device 101, the source valves 115, the image sensor 128, and/or any other component as can be appreciated. The controller 124 can be any suitable computing or processing device configured to perform processing tasks and/or control operation of equipment. In some embodiments, a single controller 124 controls the operations of the robotic system 100 and other equipment, such as conveyor belts and other robotic devices. In other embodiments, the controller 124 may comprise multiple controllers 124 that are each configured to control the operation and/or processing tasks of the various components of the robotic system 100 independent of one another.

Various applications and/or other functionality may be executed in the controller 124 according to various embodiments. The components executed on the controller 124, for example, include an end effector application 132, and other applications, services, processes, systems, engines, or functionality not discussed in detail herein. The end effector application 132 is executed to control the compression forces and/or vacuum forces applied for the individual zones configured on the multi-zone end effector assembly 103. The end effector application 132 can also control the robotic device 101, the source valves 115, the image sensors 128, and other aspects of the robotic system 100.

The one or more image sensors 128 can include a camera that captures still images or video of the packages 106 in an area surrounding the robotic device 101. Particularly, the image sensor 128 can provide imagery of the package 106 prior to the package 106 being manipulated at a first location, while it is attached to the multi-zone end effector assembly 103, and during the placement of the package 109 at a second location. The image sensor 128 can be in data communication with the controller 124. The image sensor 128 may be situated in a fixed position or configured to rotate in various orientations. The image sensor 128 can be used to detect a presence of a label 109 and its location on the package 106. Also, the image sensor 128 can be used to determine the dimensions of the package 106 and the label 109.

Figure 2:
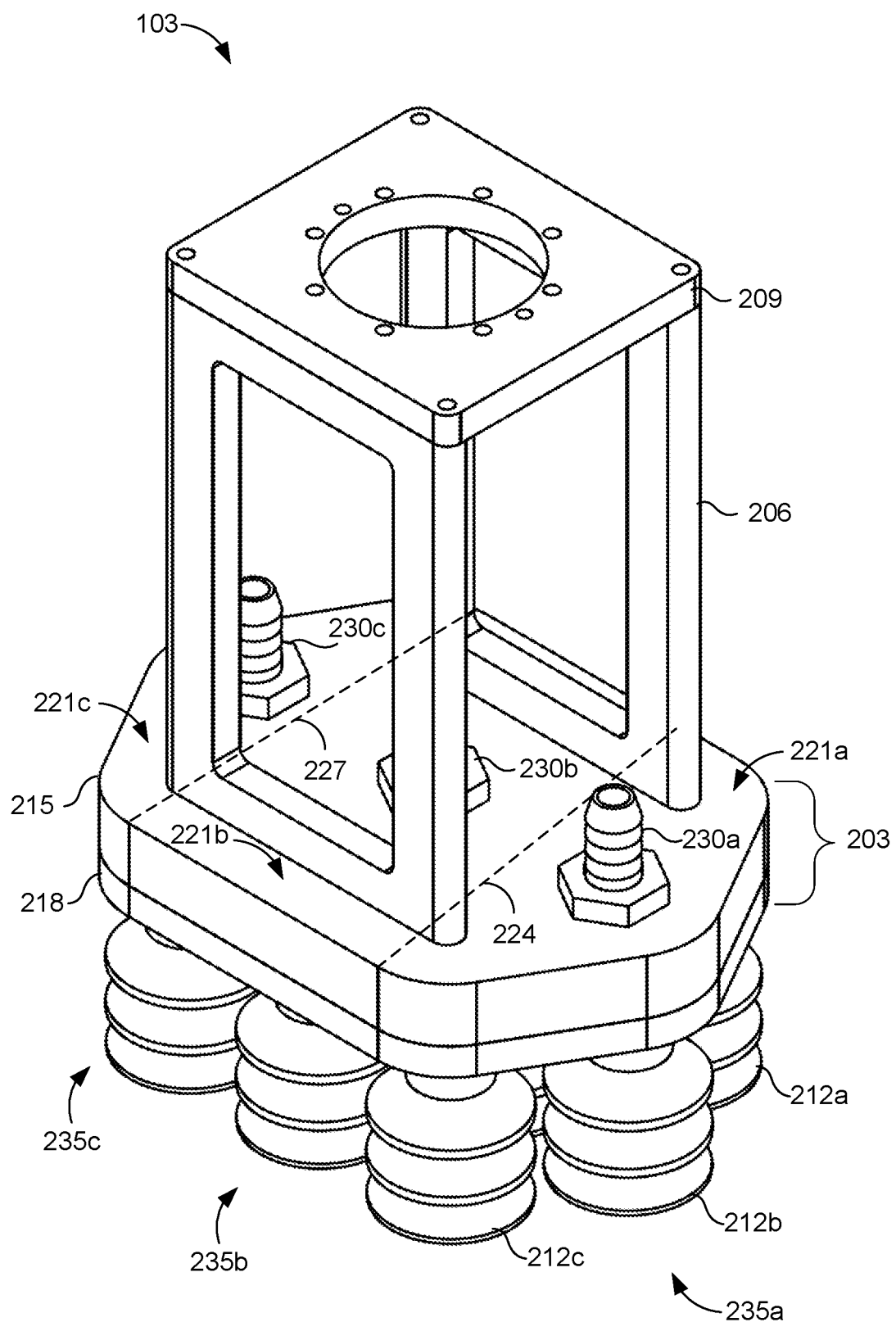
FIG. 2 illustrates a perspective view of the multi-zone end effector assembly from FIG. 1A, according to various embodiments of the present disclosure.

Moving on to FIG. 2, shown is a perspective view of the multi-zone end effector assembly 103 from FIG. 1A, according to various embodiments of the present disclosure. The multi-zone end effector assembly 103 includes a manifold 203, a spacer 206, an end of arm tooling component 209, a set of compression cups 212, and other suitable end effector components. As illustrated in FIG. 2, the manifold 203 is comprised of a top cover 215 and a base 218. Within its interior, the manifold 203 includes a first interior chamber 221a, a second interior chamber 221b, and a third interior chamber 221c (collectively the "chambers 221"). The first interior chamber 221a and the second interior chamber 221b are separated by a first partition 224. The second interior chamber 221b and the third interior chamber 221c are separated by a second partition 227. Although three chambers 221 and three zones 235 are represented in FIG. 2, the number of chambers 221 and/or zones 235 can vary. In some examples, the number of chambers 221 can vary to correspond to the number of zones 235 of compression cups 212 for the multi-zone end effector 103. For example, the manifold 203 may have two, three, four, five, or more zones 235 of compression cups 212. The manifold 203 may also have two, three, four, five, or more chambers 221.

On the top cover 215, the manifold 203 has a first port 230a, a second port 230b, and a third port 230c (collectively the "ports 230"). Each port 230 can be coupled to a different source valve 115 by way of an individual hose 112 (FIG. 1B). Each port 230 can also provide access to one of the chambers 221 in the manifold 203. Accordingly, an air connection 405 (FIG. 4A) is established between the particular source valve 115 (FIG. 1B) and an interior chamber 221.

The multi-zone end effector assembly 103 comprises compression cups 212 that can be attached to the base 218. The compression cups 212 are used to engage with one or more packages 106 (FIG. 1A). The compression cups 212 can be a variety of suction cups. In some non-limiting examples, the compression cups 212 may include a spring that can facilitate providing a compression force against package 106 when pressed against the package 106. Each compression cup 212 can provide a vacuum force upon a package 106 or some other object. The compression cups 212 can be divided into different zones 235, in which each zone 235 can represent a region that is controlled to apply a compression force or a vacuum force. Each of the compression cups 212 can be configured to access one of the chambers 221. For example, compression cups 212a, 212b, 212c can access the first interior chamber 221a through the base 218. Collectively, compression cups 212a, 212b, 212c can represent a compression cup zone 235a or region that can be controlled to create a compression force or a vacuum force for the area associated with the compressions cups 212a, 212b, 212c. In the illustrated example, the compression cups 212a, 212b, 212c can be blocked from accessing the second interior chamber 221b and the third interior chamber 221c. Accordingly, if a corresponding source valve 115 for the second chamber 221b is activated, the second interior chamber 221b and a different set of compression cups 212 are activated to provide a suction force against the package 106. It should be noted that this is one non-limiting example.

In another non-limiting example, the manifold 202 may have two zones 235 of compression cups 212. For example, a center area of compression cups 212 may be one zone 235 and a perimeter area of the compression cups 212 may be another zone 235. Accordingly, the manifold 203 and its partitions 224, 227 may be arranged in a different manner in order for the different zones 235 to have independent access to the sources valves 115.

The end of arm tooling (EOAT) component 209 provides an opening for the robotic arm 102 to couple with the multi-zone end effector assembly 103. The spacer 206 includes one or more pillars that provides sufficient spacing between the EOAT component 209 and the manifold 203. In one non-limiting example, the EOAT component 209 may have a length of about 4 inches and a width of about 3.63 inches. In this non-limiting example, the multi-zone end effector assembly 103 can also have a height about of 9.55 inches, a length of about 7.19 inches, and a width of about 5 inches.

Figure 3:
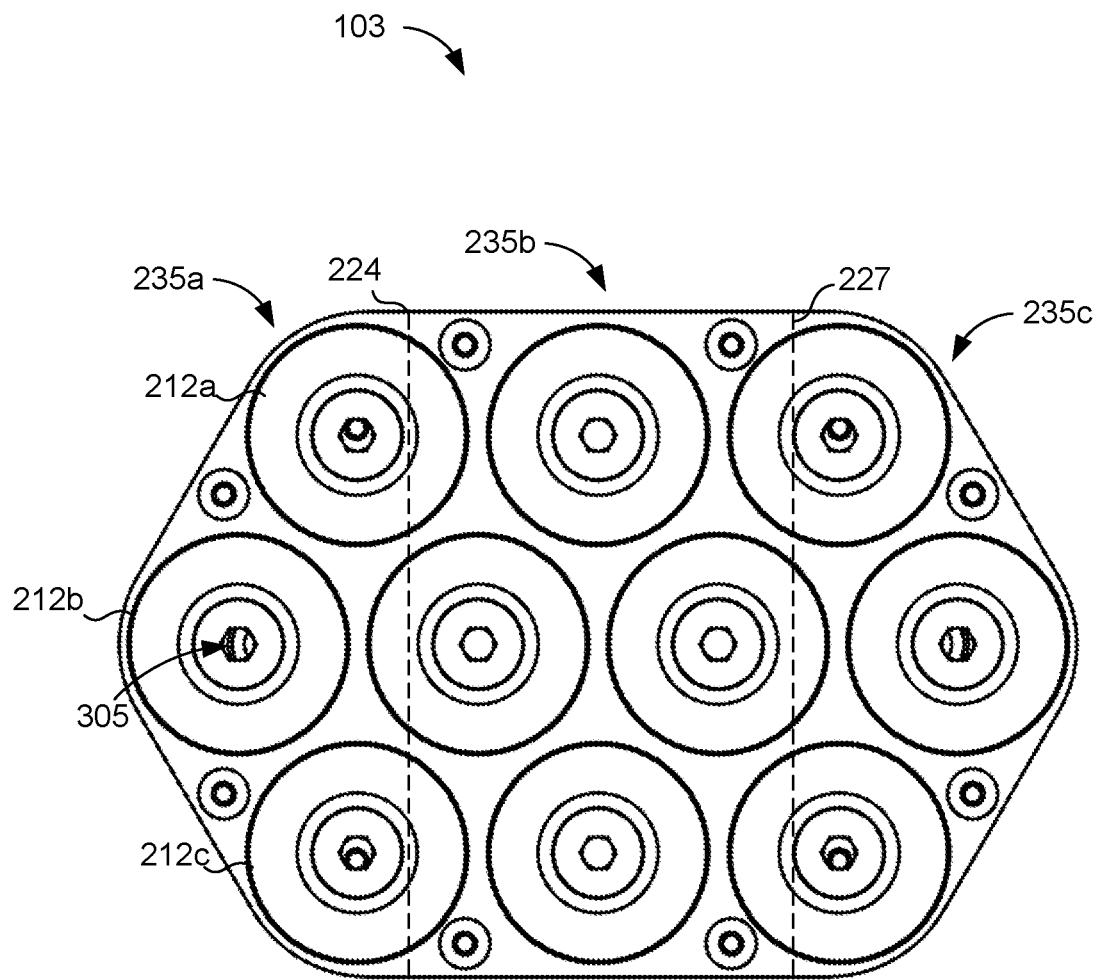
FIG. 3 illustrates a bottom view of the multi-zone end effector assembly from FIG. 2, according to various embodiments of the present disclosure.

Moving on to FIG. 3, shown is a bottom view of the multi-zone end effector assembly 103 from FIG. 2, according to various embodiments of the present disclosure. In this illustrated embodiment, FIG. 3 illustrates that the multi-zone end effector assembly 103 has ten compression cups 212 that are divided into the first zone 235a, second zone 235b, and the third zone 235c. The different zones 235 are divided by the first partition 224 and the second partition 227. As an example, three compression cups 212 are configured to access the first interior chamber 221a (FIG. 2). Four compression cups 212 in the second zone 235b are configured to access the second interior chamber 221b (FIG. 2). Three compression cups 212 in the third zone 235c are configured to access the third interior chamber 221c (FIG. 2). It should be noted that this is one non-limiting example.

In another non-limiting example, the compression cups 212 may be arranged into two zones 235. The compressions cup region of the multi-zone end effector 103 may be split in half and each half can be configured as an independent zone 235. Thus, each zone 235 may have five compression cups 212 in this example. Accordingly, the location and/or the configuration of the first partition 224 and the second partition 227 can vary to accommodate the location and number of zones 235. It should be noted that the number of zones 235 can include three, four, five, or more zones 235.

Each compression cup 212 comprises an interior opening 305 that provides access through the base 218 and into one of the chambers 221 (FIG. 2). It should be noted that the opening 305 for the compression cup 212b aligns with the first port 230a (FIG. 2). In this illustrated example, the openings for compression cups 212a and 212c do not provide a straight pathway to the first port 230a. In contrast, with respect to compression cup 212b, a direct air passageway exists from the opening 305 of the compression cup 212b straight through to the first port 230a. The openings for compression cups 212a, 212c provide an air passageway into the first interior chamber 221a, which air can then be routed around to the first port 230a. FIG. 3 also illustrates that the bottom of the multi-zone end effector assembly 103 has a hexagonal shape. The multi-zone end effector assembly 103 can be configured in various other shapes, such as a square, a rectangle, an oval, a circle, and other suitable shapes. Additionally, the quantity and pattern for the compression cups 212 can vary.

When a source valve 115 (FIG. 1B) is opened to provide access to the vacuum source 118, the zone 235 of compression cups 212 pulls in air from through the openings 305 to create a vacuum force. The vacuum force can be applied to an area substantially within and around the compression cups 212 for the zone 235. The vacuum force can be used to attach the package 106 to the multi-zone end effector assembly 103.

The number of zones 235 activated may be based on the dimensions of the package 106. For example, a package 106 with dimensions that are less than a threshold may be attached with one or two zones 235 of compression cups 212. Additionally, the number of zones 235 activated may be based on whether the multi-zone end effector assembly 103 will contact a label 109. For example, if the multi-zone end effector assembly 103 will not contact a portion of a label 109, then the end effector application may determine to use one zone 235, for example, second zone 235b.

Figure 4A:
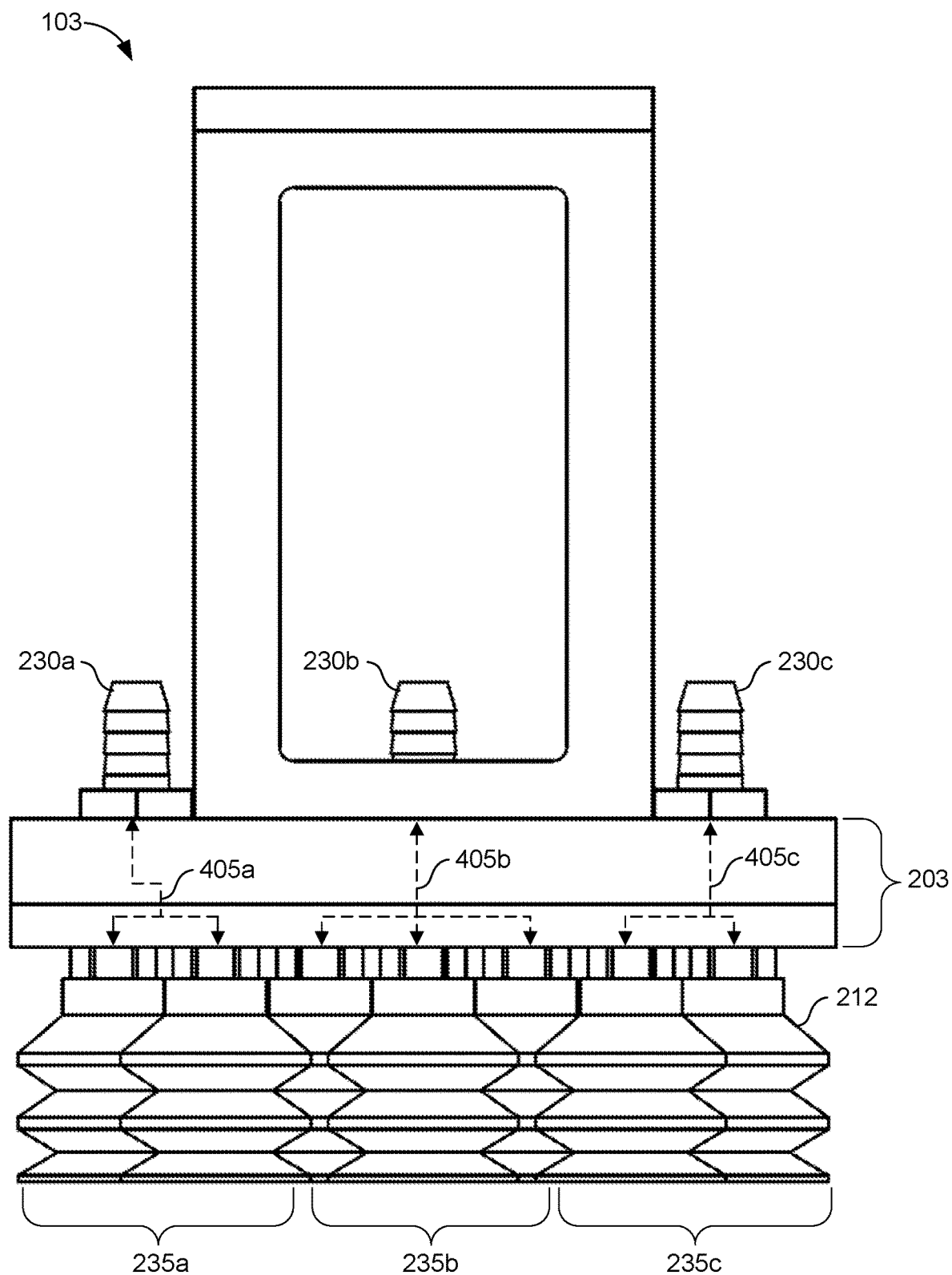
FIG. 4A illustrates a front view of the multi-zone end effector assembly from FIG. 2, according to various embodiments of the present disclosure.

Turning to FIG. 4A, shown is a front view of the multi-zone end effector assembly 103 from FIG. 2, according to various embodiments of the present disclosure. FIG. 4A illustrates that the ports 230 are each aligned with a zone 235 of compression cups 212 through one of the interior chambers 221 of the manifold 203. In the illustrated example of FIG. 4A, the interior chambers 221 (FIG. 2) provide independent air connections 405 or air passageways between the compression cups 212 and the ports 230. Specifically, the first air connection 405a can provide a channel for air or some other gas to travel between the openings 305 (FIG. 3) in the first zone 235a of the compression cups 212 and the first port 230a. The second air connection 405b can provide a channel for air or some other gas to travel between the openings 305 in the second zone 235b of the compression cups 212 and the second port 230b. The third air connection 405c can provide a channel for air or some other gas to travel between the openings 305 in the third zone 235c of the compression cups 212 and the third port 230c. Although three air connections 405 are represented in FIG. 4A, the number of air connections 405 can vary. The air connections 405 can vary to correspond to the number of ports 230, chambers 221, and/or zones 235. It should be noted the number of zones 235 can vary. For example, there may be two, three, four, five, or more zones 235 of compression cups 212.

Figure 4B:
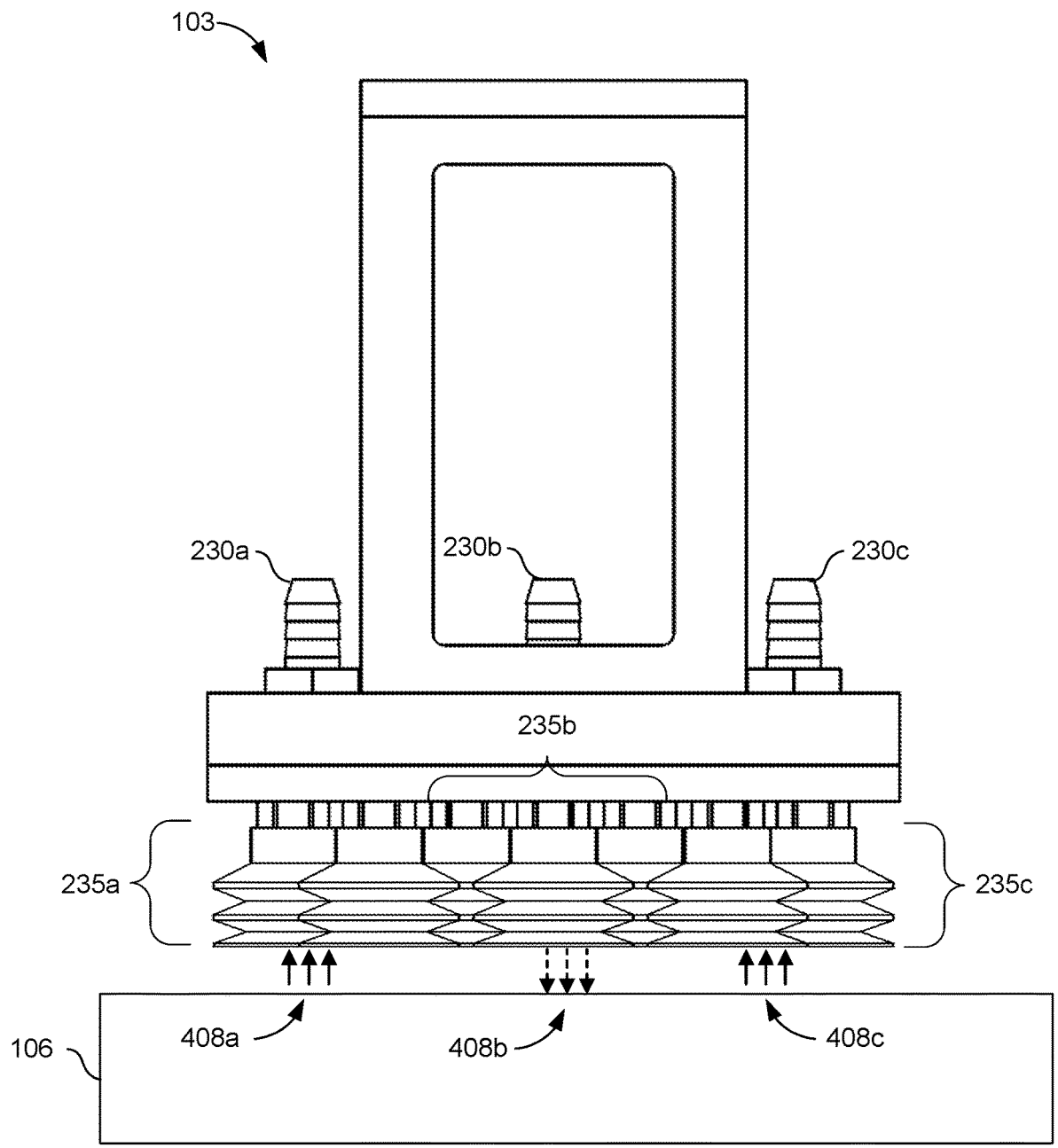
FIG. 4B illustrates a front view of the multi-zone end effector assembly from FIG. 2 attached to a package, according to various embodiments of the present disclosure.

Next, with reference to FIG. 4B, shown is a front view of the multi-zone end effector assembly 103 from FIG. 2 attached to a package 106, according to various embodiments of the present disclosure. It is assumed that the ports 230 are each independently connected to a different hose 112 (FIG. 1B), which is in turn connected to individual source valve 115 (FIG. 1B). For each hose 112, the source valve 115 controls access to the vacuum source 118 (FIG. 1B) and/or the positive pressure source 121 (FIG. 1B). It also can be assumed that the end effector application 132 (FIG. 1B) has determined that the package 106 has a label 109 (FIG. 1A) substantially near a potential area where the multi-zone end effector assembly 103 will engage the package 106, particularly the label 109 will be estimated to engage with the second zone 235b of the compression cups 212.

FIG. 4B illustrates that the end effector application 132 can activate the first zone 235a and the third zone 235c in order to create vacuum forces that pull the package 106 toward the multi-zone end effector assembly 103. During the activation of vacuum force, the second zone 235b of compression cups 212 can provide a compression force against the package 106. Reference numbers 408a and 408c refer to arrows illustrating the upward pull of the vacuum forces.

Reference number 408b refers to arrows illustrating the downward compression force being applied to the package 106 and the label 109. The vacuum forces 408a, 408c and the compression forces 408b are oriented in opposing directions with respect to the package 106.

Figure 4C:
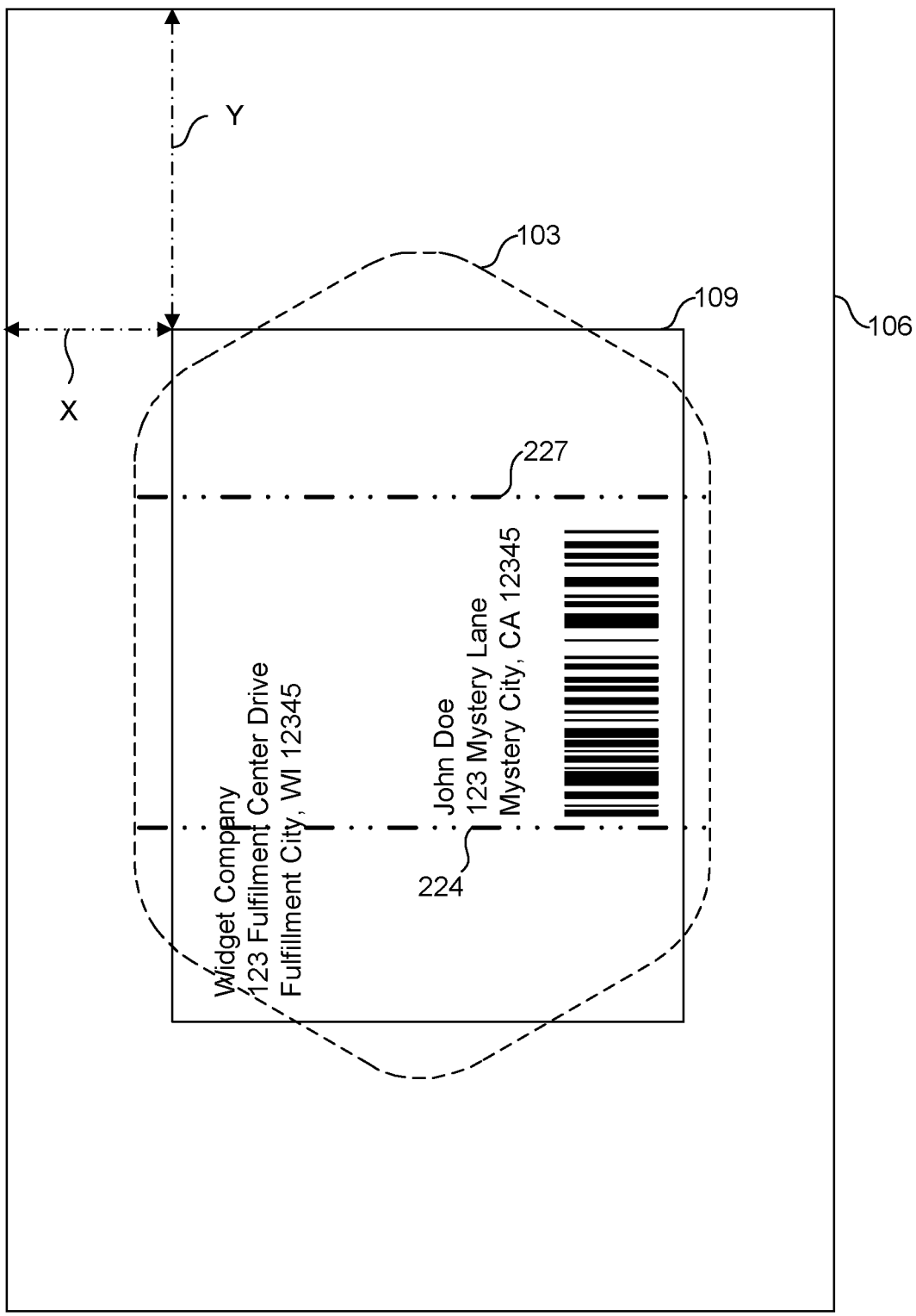
FIG. 4C illustrates a top view of the multi-zone end effector assembly engaged with the package from FIG. 4B, according to various embodiments of the present disclosure.

Moving to FIG. 4C, shown is a top view of the multi-zone end effector assembly 103 engaged with the package 106 from FIG. 4B, according to various embodiments of the present disclosure. FIG. 4C illustrates that the multi-zone end effector assembly 103 comes into contact with the label 109 on the package 106. In FIG. 4C, reference number 103 references a dashed outline of an area that the compression cups 212 (FIG. 2) of the multi-zone end effector assembly 103 could engaged with the package 106 and the label 109. During an engagement, a typical end eff effector may deform or peel off the label 109 from the package 106, which prevents devices and operators at subsequent stations from reading one or more bar codes and other information from the label 109. Label deformities may include label tears, blurring of label ink, and other suitable label deformities. In other non-limiting examples, a label deformity may include the end effector turning the flat label 109 into a three-dimensional label 109, such as causing label wrinkles, label folds, label bubbles, and other three dimensional deformities.

Before the multi-zone end effector assembly 103 engages with the package 106, the end effector application 132 (FIG. 1B) can use the image sensor 128 (FIG. 1B) to identify that the package 106 has a label 109 and its location on the package 106 in some cases. In some non-limiting examples, the end effector application 132 can determine the dimensions of the package 106 using various computer vision algorithms. The determined dimensions may include a height, width, length, and/or other suitable package dimensions. The end effector application 132 can also identify the location of the label 109 on the package 106.

In one non-limiting example, the end effector application 132 may determine the location of the label 109 by identifying at least one distance between an edge of the label 109 and an edge of the package 106. For example, FIG. 4C illustrates a first distance 'X' and a second distance 'Y' between the edges of the label 109 and the edges of the package 106. Specifically, FIG. 4C illustrates that the first distance 'X' and the second distance 'Y' are with respect to a corner of the label 109 as a reference point. It should be noted that the reference point on the label 109 may also be a center point or other locations on the label 109. Further, the end effector application 132 may also determine the dimensions of the label 109 using various computer vision algorithms.

The location and the dimensions of the label 109 can factor into which zones 235 (FIG. 2) of compression cups 212 are activated. For example, if a label 109 is not detected or detected to be located out of range of the multi-zone end effector assembly 103, the end effector application 132 may determine that the second zone 235 of the compression cups 212 has sufficient suction force for attaching a first package 106 and moving the first package 106 to a different location. In this example, the first package 106 may be considered as a small package 106 based on its dimensions.

In another example, the end effector application 132 can detect the presence of the label 109 as being located in a center location of a second package 106, as illustrated in FIG. 4C. Based on the dimension of the second package 106, the end effector application 132 may determine that the first zone 235a and the third zone 235c of the compression cups 212 have sufficient suction force for attaching the second package 106 to the multi-zone end effector assembly 103 and moving the second package 106 to a different location. In this example, the second package 106 may be considered as a medium package 106 based on its dimensions.

In another example, the end effector application 132 can detect the presence of the label 109 has being located in a center location of a third package 106, as illustrated in FIG. 4C. Based on the dimension of the third package 106, the end effector application 132 may determine that three zones 235 of the compression cups 212 are needed for moving the third package 106 to a different location. In this non-limiting example, the end effector application 132 may first activate the first zone 235a and the third zone 235c of the compression cups 212 to attach the third package 106 to the multi-zone end effector assembly 103. At this point, the second zone 235b of compression cups 212 can provide a compression force to the label 109. After a period of time has passed, the second zone 235b of compression cups 212 can be activated to create a third suction force against the third package 106. The end effector application 132 can then move the third package 106 to a different location. In this example, the third package 106 may be considered as a large package 106 based on its dimensions.

Next, a general description of the operation of the various components of the multi-zone end effector assembly 103 is provided. To begin, an image sensor 128 identifies a package 106 at a first location that needs to be moved to a second location. For example, the package 106 may need to be picked up from a package bin and placed on a conveyor belt.

Upon identifying the package 106, the end effector application 132 detects, via the image sensor 128, that a label 109 is located in a position on the package 106 that will likely contact the multi-zone end effector assembly 103. The end effector application 132 can control the robotic device 101 (FIG. 1A) to move the multi-zone end effector assembly 103 adjacent to the package 106. At this point, the end effect assembly 103 is substantially near the label 109 on the package 106. The end effector application 132 can cause the activation of a first source valve 115 (FIG. 1B) and a third source valve 115, which correspond to a first zone 235a and a third zone 235c. In this example, the first zone 235a comprises compression cups 212a, 212b, 212c. A second zone 235b can refer to a second subset of the compression cups 212, and the third zone 235c can refer to a third subset of the compression cups 212. The first source valve 115 and the third source valve 115 can open access to the vacuum source 118 for the first zone 235a and the third zone 235c.

With access to the vacuum source 118, the first zone 235a and the third zone 235c can create vacuum forces against the package 106 at areas substantially around the compression cups 212 associated with the first zone 235a and the third zone 235c. For example, compression cups 212a, 212b, 212c create a first vacuum force against the package 106. Air can be drawn from compression cups 212a, 212b, 212c, and through the first interior chamber 221a. The air can then can be drawn through the first port 230a and to the vacuum source 118 by way of the hose 112. Likewise, air travels a similar pathway for the compression cups 212 in the third zone 235c. As a result, the package 106 can be pulled toward the multi-zone end effector assembly 103 by a first vacuum force created by the first zone 235a and by a second vacuum force created by the third zone 235c.

In some examples, the first vacuum force and the second vacuum force may cause the corresponding compression cups 212 to contract. The second zone 235b of compression cups 212 can apply a compression force that is oriented in a direction from the multi-zone end effector assembly 103 toward the package 106. The compression force created by the second zone 235b can be used to press against the label 109. In effect, the compression force can be applied against the label 109 to prevent the label 109 from being deformed or peeling off. The compression force may also be used for helping adhere the label 109 to the package 106.

In some non-limiting examples, after a predefined period of time has passed, the second zone 235b of compression cups 212 can be activated to create another vacuum force against the package 106. The predefined period of time may be used to ensure that the adhesive applied to the label 109 has sufficient time to dry. The activation of the second zone 235 as a vacuum force may be because of the dimensions (e.g., height, length, weight, etc.) of the package 106. In other words, the number of zones 235 activated to create vacuum forces can be determined based on the amount of suction is needed to move the package 106. Accordingly, in some cases, the activation of the second zone 235b as a vacuum force may be omitted. With the package 106 attached to the multi-zone end effector assembly 103, the end effector application 132 can then move the multi-zone end effector assembly 103 from the first location to a second location.

In another non-limiting example, the end effector application 132 may select to activate one or more zones 235 in order to engage with a particular package 106 among several other nearby packages 106. Oftentimes, an end effector may pick up multiple packages 106 because of its large footprint. Various embodiments enable the end effector application 132 to activate one or more zones 235 in order to pick up a particular package 106 and avoid picking up other nearby packages 106.

Figure 5:
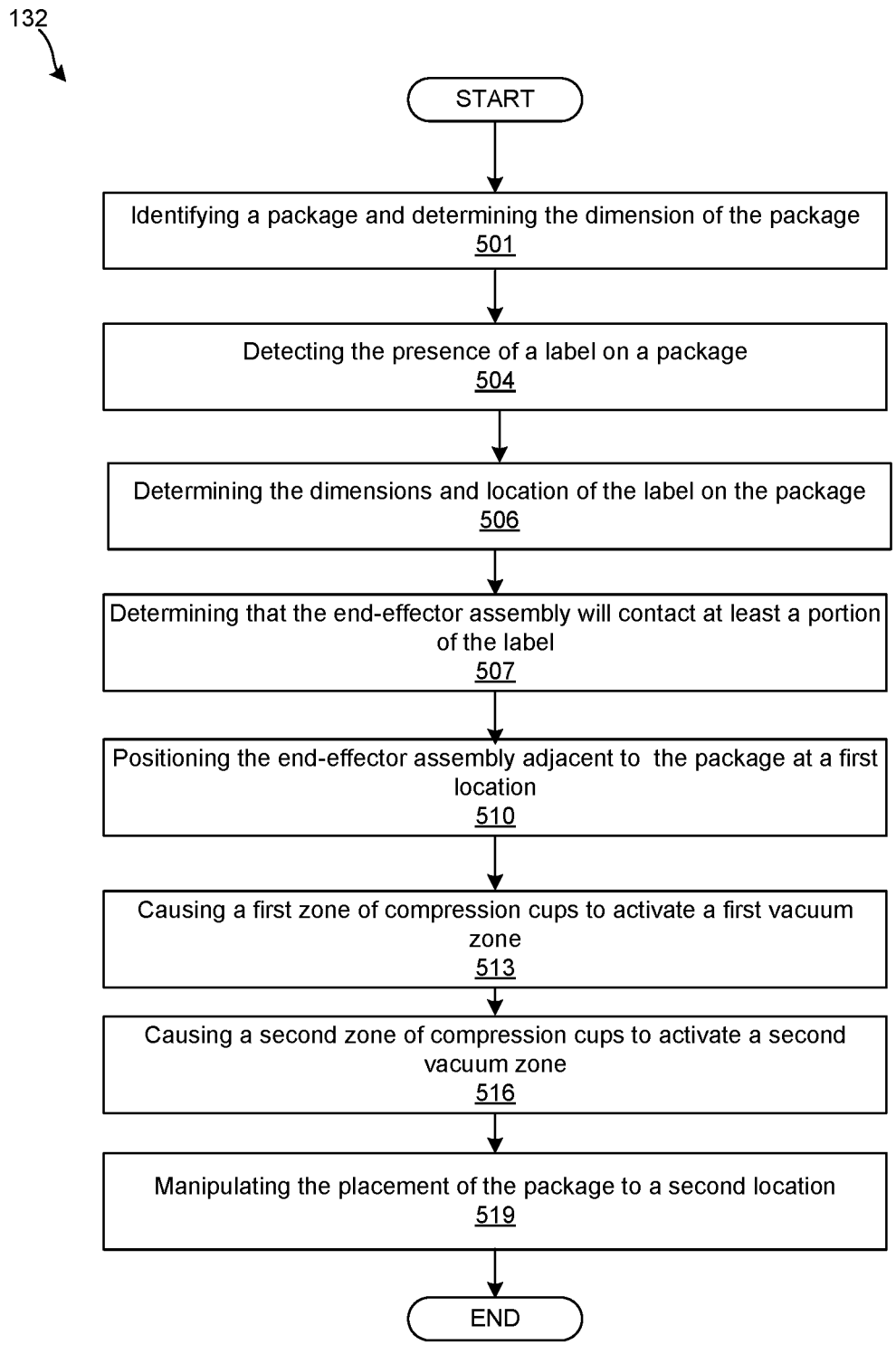
FIG. 5 is a flowchart illustrating one example of functionality implemented as portions of an end effector application executed by a controller, according to various embodiments of the present disclosure.

Referring next to FIG. 5, shown is a flowchart that provides one example of the operation of a portion of the end effector application 132 according to various embodiments. It is understood that the flowchart of FIG. 5 provides merely an example of the many different types of functional arrangements that may be employed to implement the operation of the portion of the end effector application 132 as described herein. As an alternative, the flowchart of FIG. 5 may be viewed as depicting an example of elements of a method implemented by one or more controllers 124 (FIG. 1B) according to one or more embodiments.

Beginning with box 501, the end effector application 132 can identify a package 106 (FIG. 1A) among multiple packages 106 and determine the dimensions of the package 106 by using the image sensor 128 (FIG. 1B). In some scenarios, an image or a video of the package 106 can be captured and used to identify one or more dimensions. The end effector application 132 can determine dimensions such as a length, height, width, and/or other dimensions. Various computer vision algorithms can be used to identify and measure a perimeter of a package 106.

In box 504, the end effector application 132 can detect the presence of a label 109 (FIG. 1A) on a side of a package 106. The presence of the label 109 can be determined from an image or video of the package 106. Various computer vision algorithms can be used for identifying a label 109 on the package 106. The package 106 may be a box, a flat, an envelope, or some other suitable package 106. In some non-limiting examples, a location of the label 109 can identified on the side of the package 106. For example, the end effector application 132 can determine an approximate distance between an edge of the label 109 and one or more edges of the side of the package 106.

In box 506, the end effector application 132 can determine the dimensions and location of the label 109 using the image sensor 128 (FIG. 1B). The end effector application 132 can use computer vision algorithms to determine the dimensions of the label 109. Additionally, in one non-limiting example, the end effector application 132 can determine the location of the label 109 by determining the distances between the edges of the label 109 and the edges of the package 106.

In box 507, the end effector application 132 can determine that the multi-zone end effector assembly 103 (FIG. 1A) will contact at least a portion of the label 109 based on the location of the label 109 and the dimensions of the label 109. In many scenarios, the end effector application 132 will attempt to position the multi-zone end effector assembly 103 substantially near a center area of the package 106. Accordingly, the end effector application 132 can determine whether the multi-zone end effector assembly 103 will contact at least a portion of the label 109 based on the location and dimensions of the label 109 on a side of the package 106. The determination may also include identifying a center region of the side of the package 106 and factoring in a dimension of the multi-zone end effector assembly 103. The determination of whether the multi-zone end effector assembly 103 will contact a label 109 can affect which zones 235 (FIG. 2) and when the certain zones 235 are activated in order to adhere the package 106 to the multi-zone end effector assembly 103. When multi-zone end effector assembly 103 has contact with a label 109, it can negatively affect the label 109 such as causing the label 109 to wrinkle or pull away from the package 106. These effects can increase the difficulty of the label 109 being read by a barcode reader or camera at a later stage, such as on a conveyor belt or in another area of a facility.

In box 510, the end effector application 132 can cause the multi-zone end effector assembly 103 to be positioned adjacent to the side of the package 106 at a first location. It is assumed that the multi-zone end effector assembly 103 has determined the multi-zone end effector assembly 103 will contact a portion of the label 109. In some non-limiting examples, the end effector application 132 can manipulate a robotic device 101 to move the multi-zone end effector assembly 103 to a position adjacent to the side of the package 106. In some non-limiting examples, the package 106 may be located at a first location, such as in a package drum, on a conveyor belt, or other suitable locations. For example, a robotic arm 102 (FIG. 1A) for the robotic device 101 (FIG. 1A) can be manipulated to move the multi-zone end effector assembly 103 to a center region of a package 106 in a package drum.

In box 513, the end effector application 132 can cause a first zone 235 of compression cups 212 (FIG. 2) to activate a first vacuum force against the package 106. In this non-limiting example, there may be three zones 235 of compression cups 212. In some embodiments, the end effector application 132 can also activate a second vacuum force by activating the third zone 235c. As a result, a vacuum force is applied and pulls in areas of the package 106 that are substantially near the first zone 235a and the third zone 235c. The second zone 235b of the compression cups 212 can apply a compression force in a direction from the compression cup 212 toward the package surface. Accordingly, the compression cups 212 for the second zone 235b can apply a compression force in a direction that is opposite to the vacuum force created by the first zone 235a and third zone 235c.

In this non-limiting example, it is assumed that the second zone 235b of the compression cups 212 will be substantially near a center of the label 109. Thus, the compression force can prevent the label 109 from being deformed or peeling off while a vacuum force is created by the multi-zone end effector assembly 103. The second zone 235b of the compression cups 212 may be in contact with a center or another region of the label 109. Thus, a particular zone 235 of the compression cups 212 may not be activated for a vacuum force because it is contact with a portion of the label 109.

In box 516, the end effector application 132 can cause the second zone 235b of the compression cups 212 to active a vacuum zone against the side of the package 106. In some non-limiting examples, the end effector application 132 may wait a pre-defined period of time after the first zone 235a and/or the third zone 235c has been activated before activating the second zone 235b.

In box 519, once the package 106 is attached to the compression cups 212, the end effector application 132 can manipulate the robotic device 101 to move the package 106 to a second location. In some non-limiting examples, upon arriving at the second location, the end effector application 132 can activate a source valve 115 that provide an air connection 405 to the positive pressure source 121. The positive pressure source 121 can be used to equalize the pressure at one or more of the zones 235 of the compression cups 212. As a result, the package 106 can be released and placed in a predicted manner. For example, the package 106 may be placed at a second location such as on a conveyor belt, a package drum, a pick-and-sort location, another robotic device 101, and other suitable locations. In some example scenarios, the robotic device 101 in combination with multi-zone end effector assembly 103 may be used to pick up one package 106 from a bulk package area and place the package 106 on a conveyor belt. Accordingly, the robotic system 100 can operate to organize packages 106 in a single line on a conveyor belt. The use of the positive pressure source 121 through the multi-zone end effector assembly 103 allows for placement of packages 106 with greater accuracy.

Figure 6:
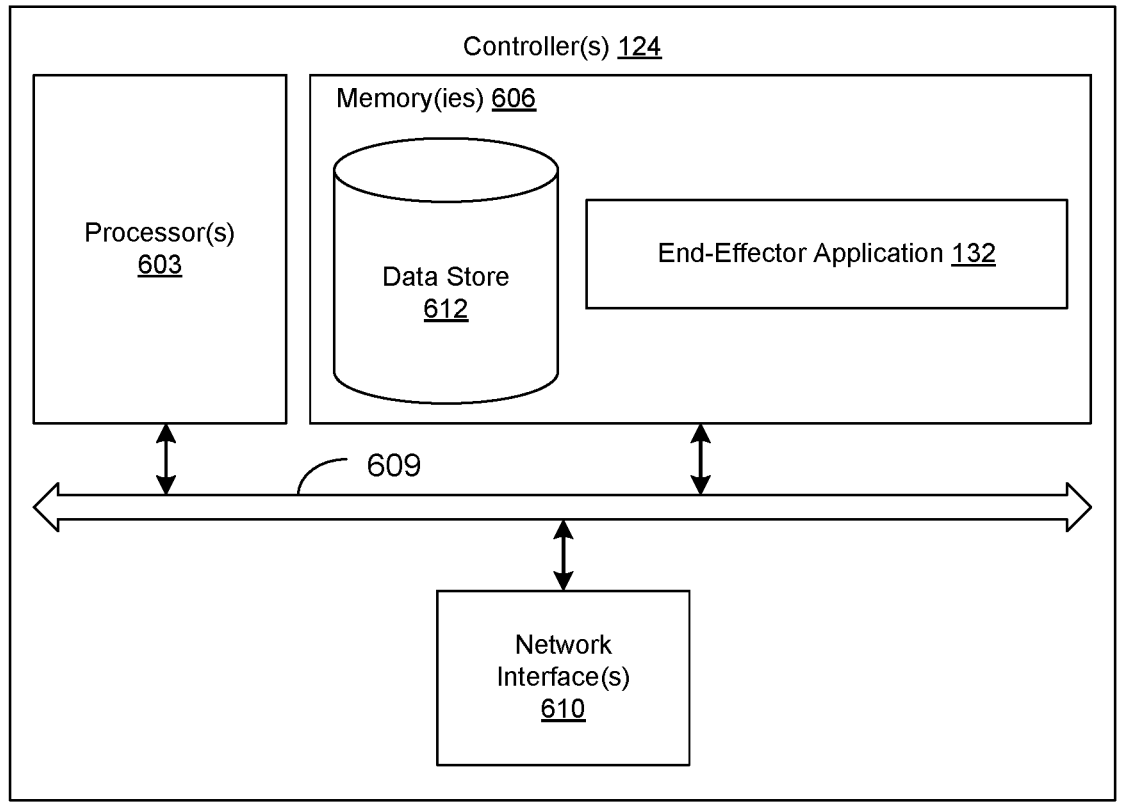
FIG. 6 is a schematic block diagram that provides one example illustration of the controller of FIG. 1B, according to various embodiments of the present disclosure.

With reference to FIG. 6, shown is a schematic block diagram of the controller 124 according to an embodiment of the present disclosure. The controller 124 may include one or more computing devices. The controller 124 includes at least one processor circuit, for example, having a processor 603 and a memory 606, both of which are coupled to a local interface 609. The local interface 609 may comprise, for example, a data bus with an accompanying address/control bus or other bus structure as can be appreciated. The controller 124 may also include a network interface 610 for data communications with the various components of the present disclosure of embodiments and for data communication with other remote computing devices.

Stored in the memory 606 are both data and several components that are executable by the processor 603. In particular, stored in the memory 606 and executable by the processor 603 is the end effector application 132, and potentially other applications. Also stored in the memory 606 may be a data store 612 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the end effector application 132 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 5 shows the functionality and operation of an implementation of portions of the application. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowchart of FIG. 5 shows a specific order of execution, it is understood that the order of execution may differ from that which is depicted. For example, the order of execution of two or more blocks may be scrambled relative to the order shown. Also, two or more blocks shown in succession in FIG. 5 may be executed concurrently or with partial concurrence. Further, in some embodiments, one or more of the blocks shown in FIG. 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including end effector application 132, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including end effector application 132, may be implemented and structured in a variety of ways. For example, one or more applications described may be implemented as modules or components of a single application. Further, one or more applications described herein may be executed in shared or separate computing devices, controllers 124 or a combination thereof. For example, a plurality of the applications described herein may execute in the same controller 124, or in multiple controller 124 in the robotic system 100. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system for manipulating a package, comprising:
   a robotic device;
   a vacuum source;
   a plurality of valves that are connected to the vacuum source;
   an end effector assembly that is coupled to the robotic device and coupled to the plurality of valves, the end effector assembly comprising a plurality of compression cups, the plurality of compression cups are individually in air connection with one of the plurality of valves; and
   a controller that is configured to at least:
      detect, via an image sensor, a label located on a package;
      manipulate the robotic device to position the end effector assembly adjacent to the package;
      cause a first zone of the plurality of compression cups to apply a first vacuum force to a first area of the package, wherein the activation of the first vacuum force causes a second zone of the plurality of compression cups to apply a compression force to a second area of the package; and
      cause the second zone of the plurality of compression cups to apply a second vacuum force to the second area of the package after a predefined period of time has occurred from causing the first zone to activate the first vacuum force.

2. The system of claim 1, wherein causing the first zone of the plurality of compression cups to apply the first vacuum force further comprises causing an activation of a first valve of the plurality of valves to open a connection to the vacuum source in order to initiate the first vacuum force.

3. The system of claim 1, wherein the controller is further configured to at least:
   cause a third zone of the plurality of compression cups to apply a third vacuum force to a third area of the package prior to the application of the second vacuum force.

4. The system of claim 1, wherein the controller is further configured to at least:
   determine, via an image sensor, a dimension associated the package; and cause a third zone of the plurality of compression cups to apply a third vacuum force to a third area of the package based at least in part on the dimension associated with the package, the third vacuum force being applied prior to the application of the second vacuum force.

5. An end effector assembly, comprising:
a manifold that comprises a first interior chamber and a second interior chamber;
a first port that connects to the first interior chamber and a second port that connects to the second interior chamber;
a first compression cup region connected to the first interior chamber, wherein the first compression cup region is in air connection with the first port, wherein the first compression cup region is configured to be independently activated in order to create a first vacuum zone; and
a second compression cup region connected to the second interior chamber, wherein the second compression cup region is in air connection with the second port, wherein the second compression cup region is configured to be independently activated in order to create a second vacuum zone.

6. The end effector assembly of claim 5, wherein the first port accesses the first interior chamber and the second ports accesses the second interior chamber from a top cover of the manifold.

7. The end effector assembly of claim 6, wherein the first compression cup region accesses the first interior chamber and the second compression cup region accesses the second interior chamber from a base of the manifold.

8. The end effector assembly of claim 5, wherein the first port is configured to be coupled to a first source valve via a first vacuum hose, and the second port being configured to be coupled to a second source valve via a second vacuum hose, wherein the first source valve and the second source valve are independently controlled by a controller.

9. The end effector assembly of claim 8, wherein the first source valve is configured to control access to both a vacuum source and a positive pressure source.

10. The end effector assembly of claim 5, further comprising a third compression cup region, wherein the first compression cup region and the third compression cup both comprise a first quantity of compression cups, and the second compression cup region comprises a second quantity of compression cups, wherein the first quantity is different from the second quantity.

11. The end effector assembly of claim 10, wherein, the second compression cup region is in between the first compression cup region and the third compression cup region.

12. The end effector assembly of claim 5, wherein the first compression cup region is activated by controlling a first source valve, and the second compression cup region is activated by controlling a second source valve.

13. The end effector assembly of claim 5, wherein, upon activation, the first compression cup region creates the first vacuum zone for a first area of a package, which causes the second compression cup region to apply a compression force to a second area of the package.

14. The end effector assembly of claim 5, further comprising:
a spacer that are coupled to the manifold; and
an end of arm tooling (EOAT) component that is coupled to the spacer, wherein the EOAT component is configured to attached to a robotic device.

15. A method for using an end effector assembly:
positioning, via a controller, an end effector assembly adjacent to a package at a first location, wherein the end effector assembly comprises a plurality of compression cups that are individually configured to operate in one of a plurality of zones;
causing, via the controller, a first zone of the plurality of zones to activate a vacuum force to be applied to a first area of the package, wherein the activation the vacuum force causes a second zone of the plurality of zones to apply a compression force to a second area of the package; and
moving, via the controller, the end effector assembly attached to the package from the first location to a second location.

16. The method of claim 15, wherein the vacuum forces comprises a first vacuum force, and further comprising:
causing, via the controller, the second zone of the plurality of zones to activate a second vacuum force to the second area of the package after a predefined period of time has occurred from causing the first zone to activate the first vacuum force.

17. The method of claim 15, further comprising:
applying, via the controller, a positive pressure to the first zone and the second zone of the plurality of compression cups, wherein the positive pressure is applied by controlling at least one source valve in air connection with the first zone and the second zone of the plurality of compression cups.

18. The method of claim 15, further comprising:
determining, via the controller in communication with an image sensor, a dimension of the package; and
causing, via the controller, a third zone of the plurality of zones to activate a third vacuum force to be applied to a third area of the package based at least in part on the dimension of the package.

19. The method of claim 15, wherein a first portion of the plurality of compression cups are in air connection with a first interior chamber of a manifold, and a second portion of the plurality of compression cups are in fluid connection with a second interior chamber of the manifold.

20. The method of claim 19, wherein the first interior chamber of the manifold is in air connection with a first vacuum valve, and the second interior chamber of the manifold is in air connection with a second vacuum valve.

* * * * *